United States Patent
Anderson et al.

(10) Patent No.: US 11,405,772 B2
(45) Date of Patent: Aug. 2, 2022

(54) MONITORING AND DIRECT COMMUNICATIONS BETWEEN MOBILE DEVICES SYSTEM AND METHOD

(71) Applicant: Amplify Development, LLC, Seabrook, TX (US)

(72) Inventors: Dustin C. Anderson, Seabrook, TX (US); Matthew J. Copiskey, Bemidji, MN (US); Kenneth F. Krutsch, Minnetonka, MN (US)

(73) Assignee: Amplify Development, LLC, Seabrook, TX (US)

( * ) Notice: Subject to any disclaimer, the term of this patent is extended or adjusted under 35 U.S.C. 154(b) by 65 days.

(21) Appl. No.: 17/116,749

(22) Filed: Dec. 9, 2020

(65) Prior Publication Data

US 2021/0176624 A1 Jun. 10, 2021

Related U.S. Application Data

(60) Provisional application No. 63/007,877, filed on Apr. 9, 2020, provisional application No. 62/945,486, filed on Dec. 9, 2019.

(51) Int. Cl.

| | |
|---|---|
| *H04W 8/22* | (2009.01) |
| *H04W 24/04* | (2009.01) |
| *H04N 7/18* | (2006.01) |
| *H04W 12/37* | (2021.01) |
| *H04N 5/76* | (2006.01) |
| *H04W 24/08* | (2009.01) |
| *G06F 8/60* | (2018.01) |

(52) U.S. Cl.
CPC ............... *H04W 8/22* (2013.01); *H04N 5/76* (2013.01); *H04N 7/185* (2013.01); *H04W 12/37* (2021.01); *H04W 24/04* (2013.01); *H04W 24/08* (2013.01); *G06F 8/60* (2013.01)

(58) Field of Classification Search
CPC ....... H04W 4/00–026; H04W 4/30–48; H04W 8/22; H04W 12/37; H04W 76/00–16; H04W 88/00–06; H04W 5/76; H04W 7/185; G06F 8/60
See application file for complete search history.

(56) References Cited

U.S. PATENT DOCUMENTS

| | | |
|---|---|---|
| 8,526,973 B2 | 9/2013 | Thomson |
| 9,148,762 B2 | 9/2015 | Taylor |

(Continued)

*Primary Examiner* — San Htun
(74) *Attorney, Agent, or Firm* — Forsgren Fisher; Daniel A. Tysver; James M. Urzedowski

(57) ABSTRACT

A system and method reports rules violations to a monitoring device relating to use of a monitored mobile device. The two devices use separate app versions linked through verification codes. The monitoring device establishes rules for use of the monitored device. When the monitored device app detects usage in violation of the rules, rule violations are reported to the monitoring app. Rules can be established that apply only in certain contexts, such as when driving a motor vehicle. The monitored app can submit a request to the monitoring app to enter passenger mode in order to avoid rule violations. The linked monitoring app can approve or deny the request. A distress stream can be started on the monitored app with a single button push. The stream is shared with the monitoring app and is automatically recorded during the stream at server location.

20 Claims, 12 Drawing Sheets

(56) References Cited

U.S. PATENT DOCUMENTS

| | | |
|---|---|---|
| 9,386,142 B2 | 7/2016 | Craine |
| 10,237,280 B2 | 3/2019 | Day, II |
| 10,349,239 B2 | 7/2019 | Demele |
| 2009/0221279 A1 | 9/2009 | Rutledge |
| 2011/0009107 A1* | 1/2011 | Guba .................... H04W 4/027 |
| | | 455/418 |
| 2015/0156061 A1* | 6/2015 | Saxena .................... H04W 4/50 |
| | | 715/733 |
| 2016/0006861 A1* | 1/2016 | Hodges .................. G06Q 10/10 |
| | | 455/405 |
| 2016/0034238 A1* | 2/2016 | Gerlach ................ G06F 3/0482 |
| | | 345/1.1 |
| 2017/0046180 A1* | 2/2017 | Desineni ................. G06F 9/542 |
| 2018/0234496 A1* | 8/2018 | Ratias ................... H04L 9/3239 |

* cited by examiner

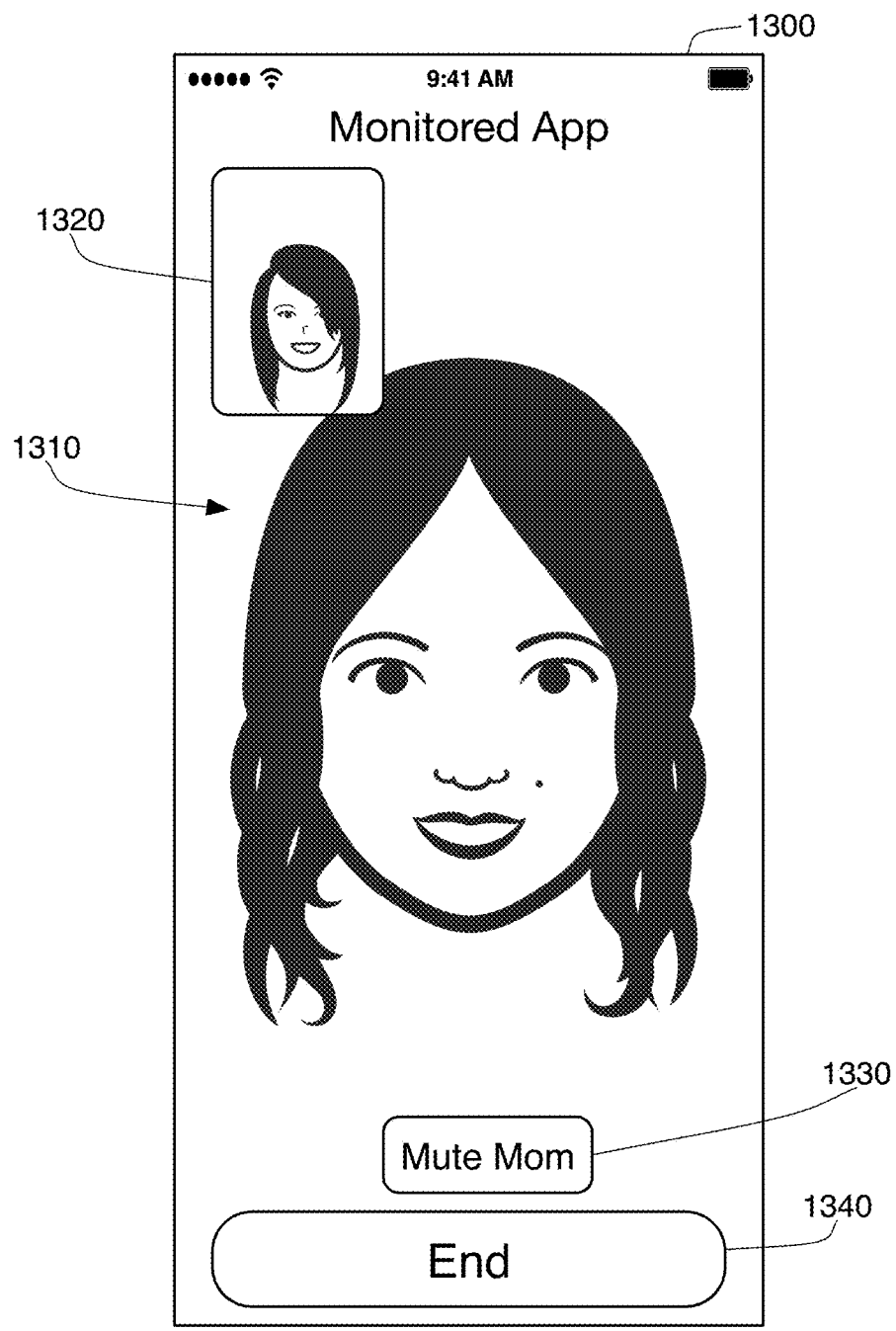

MONITORING AND DIRECT COMMUNICATIONS BETWEEN MOBILE DEVICES SYSTEM AND METHOD

RELATED APPLICATIONS

This application claims the benefit of provisional application Ser. No. 62/945,486, filed on Dec. 9, 2019, as well as the benefit of provisional application Ser. No. 63/007,877, filed on Apr. 9, 2020. These priority applications are hereby incorporated by reference in their entireties.

FIELD OF THE INVENTION

The present invention relates to monitoring the usage of a mobile device and creating a distress stream from the monitored device.

SUMMARY

A system and method are presented for identifying and reporting rules violations relating to use of a monitored mobile device (or other computing device). Rules are establishing by a monitoring device, and any rule violations are reported back to the monitoring device. The two devices may be smartphone devices that are operating distinct apps, namely a monitoring app and a monitored app. The monitoring app can be used, for example, by an employee seeking to monitor usage of a company smartphone by an employee, or by a parent seeking to control usage of a device by their child.

The monitoring app is linked to the monitored app through the use of a deep link sent in a message to the monitored device. The link is created by the monitoring app and included in a message that may be sent outside of that app. The message requests the user of the monitored device to install the monitored app on their device. By following the deep link created by the monitoring app, the monitored device can both download the monitored app and establish a preliminary relationship between the monitoring and monitored app. Confirmation of this relationship is made through the verbal sharing of authentication or PIN codes between the two devices. In alternative embodiments, this confirmation is accomplished by verifying the phone number of the linked-to device.

Once linked, the monitoring app establishes rules that govern the use of the monitored app. These rules can apply to certain detectable situations or statuses on the monitored device. One status relates to time of day, while another status relates to whether the device is in a moving motor vehicle. Rules can state, for example, that certain apps cannot be used by an employee when away from a work location during working hours or by a child after bedtime. Other rules limit usage of the monitored device while driving a motor vehicle. Some rules may allow a whitelist of apps to be operated even if the monitored device is considered to be in restricted status such as when it is in a driving mode. Other rules may allow communication with a whitelist of contacts during those times of restriction. The monitored device can request additions to the whitelists, which are presented to the monitoring device for approval.

A monitored device can be moved from driving status to passenger status through selection of an interface element on the monitored app. Some rules or preferences may require that such a switch be presented to the monitoring app for approval. The approval can be time limited, such as only during the current trip or for the current day. The monitoring app can also reject a request for the monitored device to move from driving to passenger status.

A distress stream can be started on the monitored device with a single interaction with a presented interface element. The distress stream immediately causes a server to record streaming video from the camera and microphone of the monitored device. Notification is also immediately provided to the monitoring device. Upon selection of the notification, the monitoring app will present the live video stream from the monitored device on the monitoring device. The monitoring device can likewise share an audio and visual stream with the monitored device.

BRIEF DESCRIPTION OF THE DRAWINGS

FIG. 13 is a user interface shown on the monitored device during the distress stream.

DETAILED DESCRIPTION

System

Figure 1:
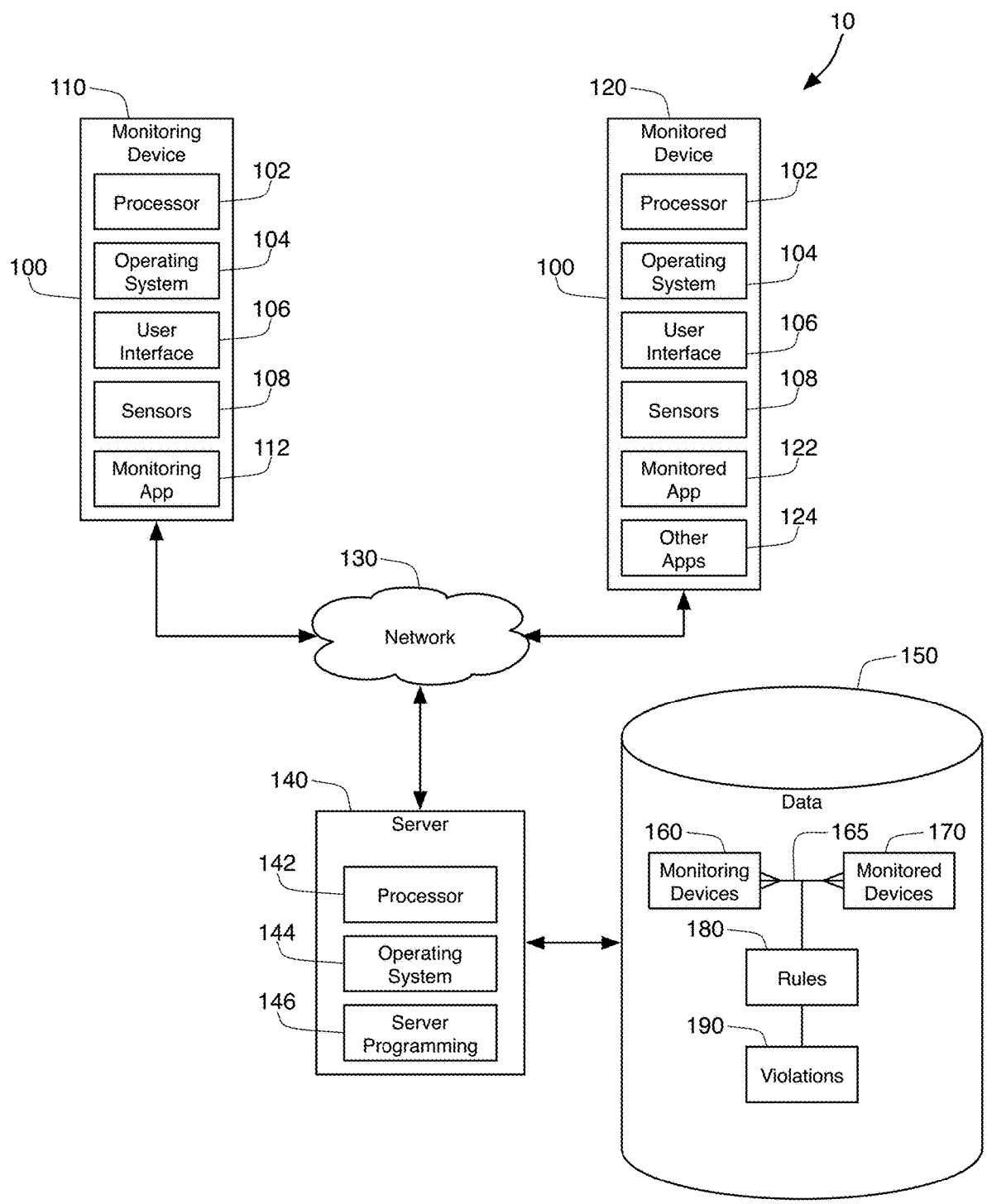
FIG. 1 is a schematic view of a system comprising a monitored device, a monitoring device, and a server communicating over a network.

FIG. 1 shows a system 10 comprising a two computerized devices 100, namely a monitoring device 110 and a monitored device 120. These two devices 100 communicate over a network 130. In one embodiment, both devices 100 comprise cellular devices such as smart phones. In other embodiments, the devices 100 can take the form of traditional desktop or laptop computers. In a preferred embodiment, at least the monitored device 120 is a cellular or other type of mobile device. Cellular devices 100 can communicate via cellular voice communications over a cellular voice network 130, cellular data communications over a cellular data network 130, text or multimedia communications over an SMS or MMS network 130, or Internet data over an Internet network 130 accessed via, for example, a local Wi-Fi network. Although only a single network 130 is shown in FIG. 1, it is contemplated that the devices 100 will be capable of communicating with each other over multiple such networks 130 simultaneously or in sequence.

Each device 100 contains a processor 102 for processing computer instructions and manipulating data. If the devices 100 are smartphones, it is likely that the processors 102 comprise a reduced instruction set (RISC) processor such as the processors produced under the designs of Arm Ltd. of Cambridge, England. The general operation of the devices 100 is under the control of operating system programming 104. This programming 104 is stored on memory or storage (not shown in FIG. 1) found on the devices 100. The operating system may, for example, be iOS from Apple, Inc. (Cupertino, Calif.) or Android from Google LLC (Mountain View, Calif.). The operating system 104 is able to receive input, and provide visual, audio, and haptic feedback via a user interface 106 created and managed by the operating system 104. In preferred embodiments, the user interface 106 is able to provide notifications to users of the devices 100 on the occurrence of events created by the device 100 or received by the device 100 over the network 130. Furthermore, each of the devices 100 includes a plurality of sensors 108 that monitor the environment in and around the device 100. These sensors 108 include position sensors that can sense changes in position, velocity, and acceleration of the device 100. The sensors 108 may also include proximity sensors, light sensors (including cameras), sound sensors (microphones), touch sensors (including touch screen input), fingerprint sensors, etc.

Finally, each of the devices 100 is capable of running application programming (or "apps") that are stored on the device 100 in memory and are used to control the processors 102. In FIG. 1, the monitoring device 110 is operating a monitoring app 112, while the monitored device 120 is operating a monitored app 122. These apps 112, 122 can be downloaded through app "stores" operated by the companies that provide the operating system 104 or, in some cases, from other "stores" or download locations available over the network 130. The monitored device 120 is also shown with other apps 124. These apps 124 comprise other programming other than the operating system 104 and the monitored app 122 that operate on the monitored device 120.

In one embodiment, the communications and other monitoring behavior between the two devices 110, 120 is assisted and controlled by the actions of a server computer 140 that also communicates over the network 130. The server 140 comprises one or more computing devices, each of which has a computing processor 142. In the case of server computers, the processors 142 are more likely to be central processor units provided by Intel Corp. (Santa Clara, Calif.) or Advanced Micro Devices, Inc. (also of Santa Clara, Calif.), but these could also operate on RISC processors such as the M1 processor from Apple. The devices that comprise the server 140 also run under the direction of an operating system 144, and further have custom server programming 146 to control the operation of the server 140. The server 140 and its programming 146 are able to maintain data related to system 10 in a data store 150. This data 150 can comprise a database, such as a relational or object-oriented database. The server 140 may be locally connected to the data 150 or can be connected to the data 150 through a storage area network (SAN), a local network (LAN), or even across network 130.

The goal of the system 10 is to have the monitored device 120 monitor the sensors 108 and the usage of other apps 124 according to rules. In one embodiment, the rules are created by the monitoring app 112 operating in conjunction with the server programming 146 on the server 140. The rules define how the monitoring device 110 is monitoring the monitored device 120. In one embodiment, the server 140 stores data about monitoring device 110 in data element 160 within data/database 150. The monitoring device data element 160 may, for example, take the form of records in one or more tables in a relational database, or one or more objects in an object-oriented database. The server 140 stores information about the monitored devices 120 in data element 170. The database 150 also stores information about relationships 165 between monitoring device data 160 and monitored device data 170. These relationships 165 are shown in FIG. 1 as a crows-foot line that shows a many-to-many relationship between these elements. This means that a single monitored device 120 in system 10 can be monitored by multiple monitoring devices 110, and a single monitoring device 110 can monitor multiple monitored devices 120. It is also possible for multiple monitoring devices 110 to monitor an identical set of monitored devices 120. An example of this type of many-to-many relationship 165 might be multiple supervisors using their monitoring devices 110 to monitor a single team of employees using monitored devices 120, or multiple parents using monitoring devices 110 to monitor the same family of children using monitored devices 120.

The rules that govern this monitoring are set forth as rule database elements 180 in database 150. As shown in FIG. 1, the rules 180 help provide details about the relationship 165 between a monitored device 110 and a monitored device 120. Rules 180 can be shared across multiple relationships 165, so that the same rules 180 govern each relationship 165 between the multiple supervisors and the multiple employees of their team, or between multiple parents and each of their children. The system 10 is designed to identify violations of these rules 180 by the monitored device 120. These violations are also stored in data 150, in this case as data element 190.

Linking a Monitoring Device 110 to a Monitored Device 120

Monitoring devices 110 are characterized in that they are running the monitoring app 112, while monitored devices are characterized in that they run the monitored app 122. In some embodiments, these two apps 112, 122 contain the same programming running in different "modes." Thus, the program, when loaded, can ask or otherwise determine whether it should run in its monitoring mode (and thus take the form of monitoring app 112) or in its monitored mode (taking the form of monitored app 122). In this type of environment, it may be important to lock the app into a particular mode, so that the user of monitored device 120 does not disable the monitored mode (monitored app 124) by changing its mode. In other embodiments, the same app can run simultaneously in monitoring and monitored mode.

Even though the same application can be used on both the monitoring device 110 and the monitored device 120, it can prove useful to keep the two apps 112, 124 distinct from each other. In other words, each app 112, 124 can take the form of a different application on the app store reached through the operating system 104. Ideally, different versions of these apps 112, 122 can also be compiled for different operating systems 104, so that an app 112, 122 designed for that operating system 104 will be available to the devices 100 regardless of which operating system 104 is operating on the device 100. It is possible and expected that the operating system 104 on the monitoring device 110 may be different than the operating system 104 on the monitored device 120.

Figure 2:
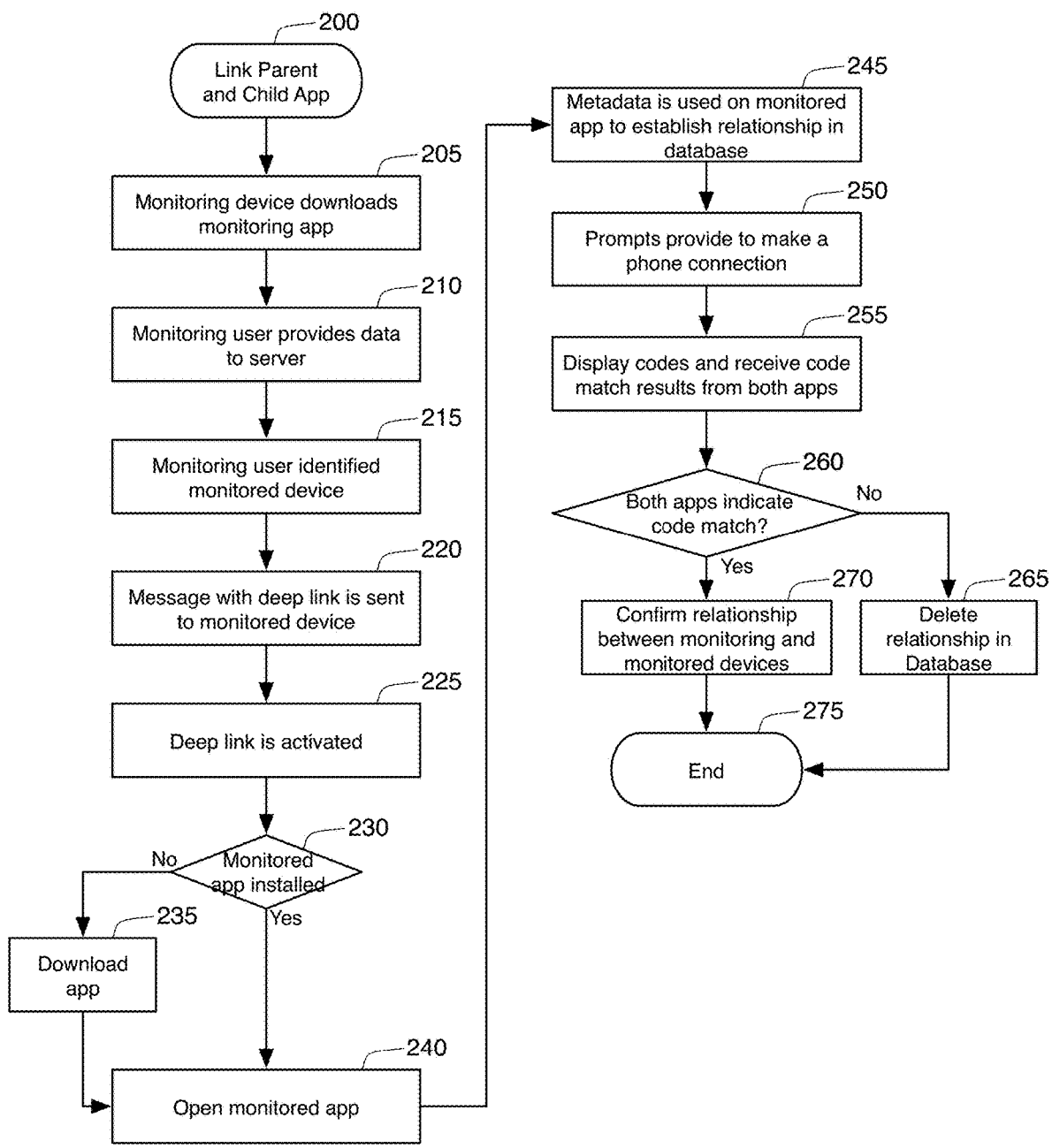
FIG. 2 is a flowchart showing a method for the initiation of monitoring between the monitored device and the monitoring device.

A method 200 for linking the monitoring app 112 on the monitoring device 110 with the monitored app 122 on the monitored device 120 is shown in the flow chart of FIG. 2. The process starts at step 205 with the monitoring device 110 downloading the monitoring app 112 from the appropriate app store. The user of the monitoring device 110 (the monitoring user) provides information about themselves through the app 112 to the server 140, which stores their information in a monitoring device data entity 160 (step 210).

At step 215, the monitoring user needs to identify the monitored device 120 (or the monitored user using the device 120) to their app 112. This can be accomplished by examining a contact list or address book on the device 110 to identify the correct user. Typically, the contact found in this information will contain a communications address or number that is used to contact the device 120 for the selected user, such as a phone number, an email address, or another type of user identifier that can communicate with one of the other apps 124 on the device 120. The monitoring user does not have to utilize a contact list or address book, as they are free to directly enter the address or number of the monitored device 120 into a user interface 106 provided by app 112.

Once the monitored device 120 is identified, a message containing a deep link is sent to the monitored device 120. In the preferred embodiment, the message is sent from the monitoring device 110 as opposed to from the server 140, typically using a messaging application that is separate from the monitoring app 112. For instance, a text message can be sent from the monitoring device 110 to the monitored device 120. In this way, the monitored user will be able to easily identify the source of the message and be more willing to accept the authenticity of, and the instructions within, the message. For example, a parent can send a text message to a child whose device 120 they wish to monitor, or a supervisor can send an email message to a to-be-monitored employee. The message includes instructions explaining how to install the monitored app 122.

The deep link included in the message is an app deep link that, when selected by the monitored user, will cause the operating system 104 to either i) open the monitored app 122 if it is already installed on the monitored device 120, or ii) open an app store available over the network 130 to a location where the monitored app 122 can be downloaded. The deep link is typically a URL link that is capable of instructing the operating system 104 to open a particular application 122, 124 on the device 120. In iOS, these links to applications are known as "universal links." In Android, these links are called App Links. These links are also referred to as deep links because the URL can contain metadata that instructs the app to open particular content or features within the app. These links are allowed by the operating system 104 to open an app only if data authorizing the link is found in app data maintained by the device 120 and similarly authorizing data is also found on the web server identified by that URL link. The app data identifies the web server's domain name, while the web server for the domain found in the URL provides the identifier for the app 122, 124 running on the device 120. If there is a match between this data, then the operating system 104 will trust that the app can receive certain URLs that would otherwise be directed to the domain's web server.

If the monitored device 120 does not contain the linked-to monitored app 122 identified in the deep link, the URL will be handled by a browser (one of the other apps 124), which will contact the web server for that URL. At that URL, the web server will provide a second deep link that is automatically opened. This second deep link is to the app store for the operating system 104 on the monitored device 120. This link will cause the app store programming on the monitored device 120 to open to the download location for the monitored app 122. Some third party service providers, such as Branch Metrics, Inc. (Redwood City, Calif.), provide services to allow the content specified by the original deep link (the exact location within the monitored app 122 that is desired or the exact data needed by the app 122) to be maintained during the app store download process, so that when the user has downloaded and installed the monitored app 122 the correct content and data will be displayed by the newly downloaded app 122.

The message sent at step 220 can be boilerplate instruction language created by the monitoring app 112. In most embodiments, the monitoring user would be allowed to modify this boilerplate language message before sending the message through a messaging app on their device 110. In either case, the deep link included in the message will have been generated by the monitoring app 112. This ensures that the deep link sent in the message at step 220 contains data that can be used to connect the monitored app 122 with the monitoring app 112 by the server 140. The recipient of the message activates the deep link at step 225. If the monitored app 122 needs to be downloaded (as determined by step 230), the deep link will get the user to the exact location needed to download the monitored app 122 (and not, for instance, the monitoring app 112). The user then downloads the app 122 at step 235.

At step 240, the monitored app 122 is opened on the monitored device 120. If the monitored user has not used the app before, they may be requested to provide some information, such as just a name (for children) or their name and employee identification number (for employees). This data can then be used by the server 140 to create the monitored device data element 170 for this device 120. In some embodiments, the metadata contained in the deep link also includes sufficient data to create the monitored device data record 170. Such data could have been obtained, for instance, from the contact information identified on the monitoring device 110 before the message is sent. In this way, it would not be necessary for the user of the monitored device 120 to enter any data before the record 170 is created.

The metadata contained in the universal/deep link that opened the monitored app 122 is then used to associate the monitoring device 110 that created the deep link (and sent the message) with the monitored device 120 at step 245. This association is formally stored as a relationship 165 established in the database 150 between the appropriate monitoring device data element 160 and the associated monitored device data element 170.

Although this relationship 165 can be created merely through the use of the metadata embedded in the deep link, the preferred embodiment uses additional steps to ensure the accuracy and security of this association. In one embodiment, these steps involve establishing a voice call between the two devices 110, 120 and a verification of security codes that are shown by the apps 112, 124. To establish the voice call, both apps 112, 122 can prompt their users to contact each other via a phone call. In other embodiments, only the monitoring app 112 or only the monitored app 122 provide the prompt to establish a phone connection between the devices 110, 120. This occurs at step 250.

Figure 3:
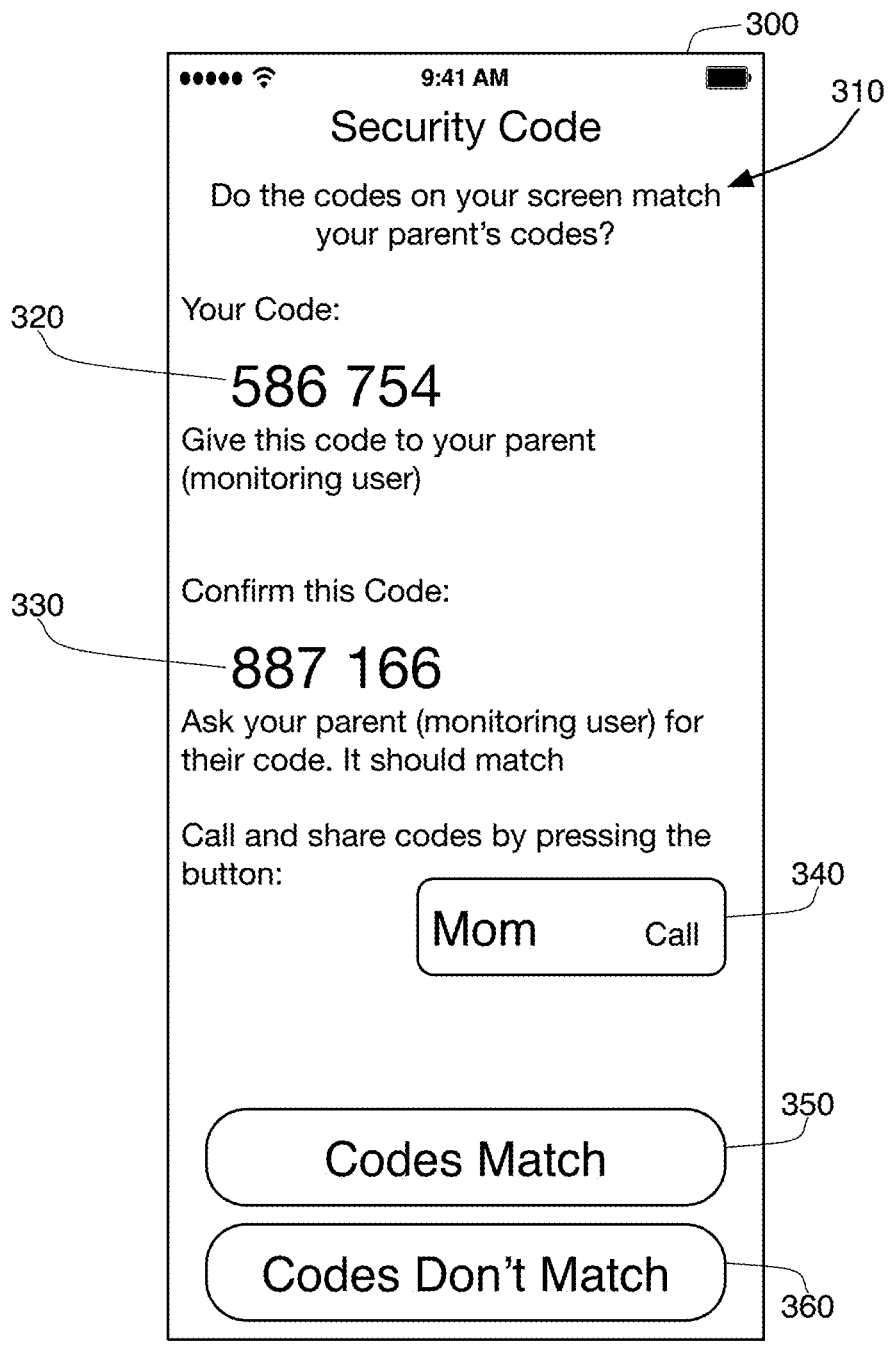
FIG. 3 is a user interface shown on a monitored device during the method of FIG. 2.

Next, at step 255, both the monitoring app 112 and the monitored app 124 display a user interface to present and/or receive a confirmation code. In one embodiment, the prompt to establish the phone call and the interface to receive code confirmation (steps 250 and 255) can be combined into the same user interface. FIG. 3 shows an interface 300 that might be shown by the monitored app 122 to perform steps 250 and 255. A similar interface will be shown by the monitoring app 112. This interface 300 includes instructions 310 that inform the monitored user how to contact the monitoring device 110 and how to exchange and verify security codes. In this case, the interface 300 provides a monitored user code 320 and also discloses the monitoring user's code 330. These codes 320, 330 can be numeric codes, also referend to as PIN codes. A direct phone-link 340 is provided to initiate a phone call to the monitoring device 310. In example interface 300 shown in FIG. 3, the monitored user is a child and the monitoring user is a parent (Mom).

When the link 340 is pressed, a phone call request to the appropriate phone number is presented by the app 122 to the operating system 104, which then makes that call. When the parties are connection, the two users can verify that the codes 320, 330 displayed on their two devices 110, 120 match as they should. The monitoring user reads their code to the monitored user, and vice versa. Both parties then verify that the code they are read matches the code displayed on their interface 300. If they do match, both users will press the codes match button 350. If they don't match, then one or both will press the codes don't match button 360 and the system 10 will know that something is wrong with the data 160, 165, 170 in the database 150.

In an alternative embodiment involving two smart phone devices 110, 120, the interface 300 merely displays the phone number of the linked to device 100. On the monitored device 120, the interface would display the phone number of the monitoring device 110. On the monitoring device 110, the interface 300 displays the phone number of the monitored device. The two buttons 350, 360 then would just either confirm that this is the correct phone number, or indicate that the phone number is not the number that was expected.

The receipt of this verification data also occurs at step 255. Step 260 then verifies that both devices 110, 120 have indicated a match. If both do not confirm the match, then step 265 will delete the relationship 165 between the relevant data 160, 170 for these devices, and the method 200 for establishing the link between the monitoring device 110 and the monitored device 120 will end at step 275 in failure. If they do match, the relationship 165 has been verified and can be used to establishing a monitoring relationship between the monitoring device 110 and the monitored device 120. This confirmation is shown at step 270. The method 200 then ends at step 275

Establishing Rules

Figure 4:
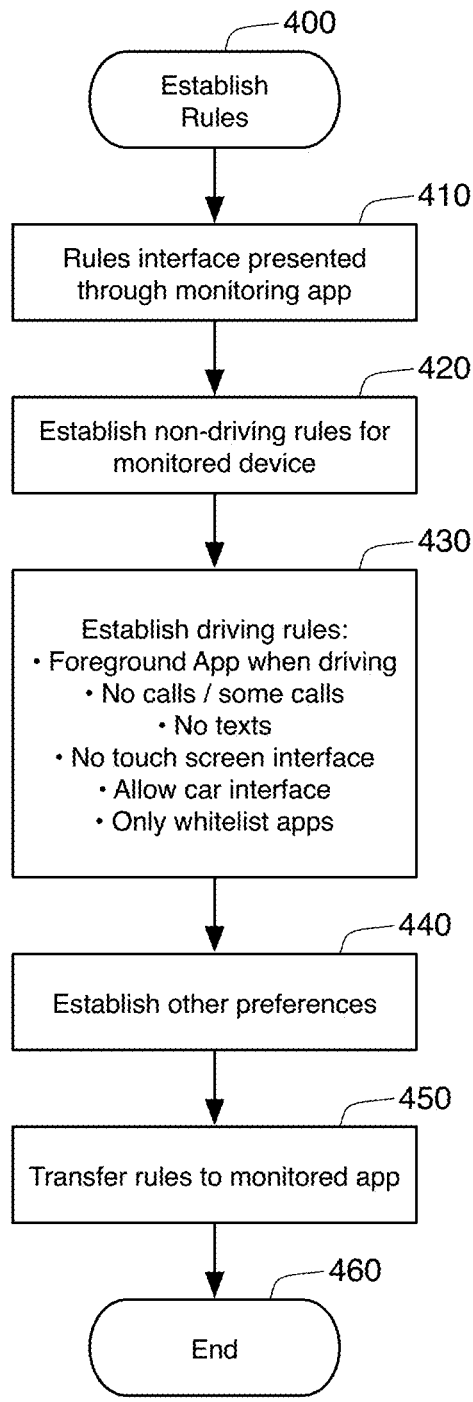
FIG. 4 is a flowchart showing a method for establishing rules for the monitoring of a monitored device.

After establishing the relationship 165 between the monitoring device 160 and the monitored device 170 in the database 150, the monitoring app 112 presents to the monitoring user the ability to establish a set of rules 180 for the monitored device 120. This is accomplished through method 400 shown in FIG. 4. The first step 410 of this method 400 is to present a user interface 106 to receive rules from the monitoring user. These rules are stored as rule data entities 180 in the database 150. The monitored app 122 receives these rules 180 and then determines whether the use of the monitored device 120 violates any of these rules. To compare the use of the device 120 against the rules 180, the monitored app 124 must receiving these rules, and then analyze data from the sensors 108 and from the operating system 104, and also monitor the use of other apps 124.

The rules 180 created by the monitoring device 110 can be of a variety of types. At step 420, the monitoring device 110 is able to establish rules that do not relating to driving interactions. For example, the rules 180 established at step 410 may relate to time-of-day. Rules 180 for employees could limit the employees to using only certain apps during work-hours. Rules 180 for children could prevent the use of certain apps, or any apps, after bedtime. The rules 180 could also relate to specific geographic locations using geofencing techniques. Alternatively, the rules 180 created at step 410 may apply regardless of the current status or location of the monitored device 120 and regardless of the current time.

At step 430, rules 180 are created that relate to use of the monitored device 120 while driving. Modern operating systems 104 track changes in the motion and acceleration sensors 108 as well as position sensors to determine in the background when the device 120 is being driven in an automobile or other motor vehicle. Apple's iOS, for example, has a "Do Not Disturb While Driving" mode that, when active, monitors the motion and location (GPS) sensors 108 to detect when the phone may be moving within a motor vehicle. Google's Android operating system has a similar feature that also detects when the phone may be moving using the same combination of sensors.

The operating system 104 may provide this information to apps running on the device 120 including the monitored app 122. Alternatively, the monitored app 122 can monitor these same sensors 108 to make this determination by itself. When it is determined that the monitored device 120 is in a moving motor vehicle, the rules 180 established at step 420 are monitored. These rules 180 might require, for example, that the monitored app 122 be operating in the foreground when the monitored user is driving, or that no calls be made or received when driving, or that no text messages can be sent, or that no touchscreen interaction is allowed, or that no other apps 124 can be operated. The rules 180 can also be more nuanced, such as allowing calls or texts to be made to communicate specifically with the monitoring device 110 or other devices provided on a whitelist of contacts. Similarly, some other apps 124 might be allowed if on a pre-approved whitelist of apps 124. The rules 180 might also allow use unlimited use of the monitored device 120 through particular modes, such as through an automobile interface (such as Android Auto or CarPlay) or through voice control only.

The content of the rules 180 can vary considerably. However, it must be possible for the monitored app 122 to determine if the rules have been violated. Thus, the rules must relate to activities on the monitored device 120 that can be detected by the monitored app 122 when operating on the device 120. This monitoring can relate to various sensors 108 on the device 120, including, for example, movement or acceleration sensors, time of day (clock) sensors 108, position and location (GPS) sensors 108, or light (camera) sensors 108. If accessible, the monitored app 122 could also compare rules to system information, such as cellular data usage, data download, and screen time duration tracking. Also, if made accessible to the app 122, the app 122 can monitor usage of the other apps 124 on the device 120.

At step 440, other preference data can be received from the monitoring app 112. At step 450, rules that have been created are shared with the server 140 and stored as rules 180 in the database 150. In addition, the rules 180 are shared with the monitored app 122 in order for that app 122 to monitor usage of the monitored device 120 in accordance with those rules.

Figure 5:
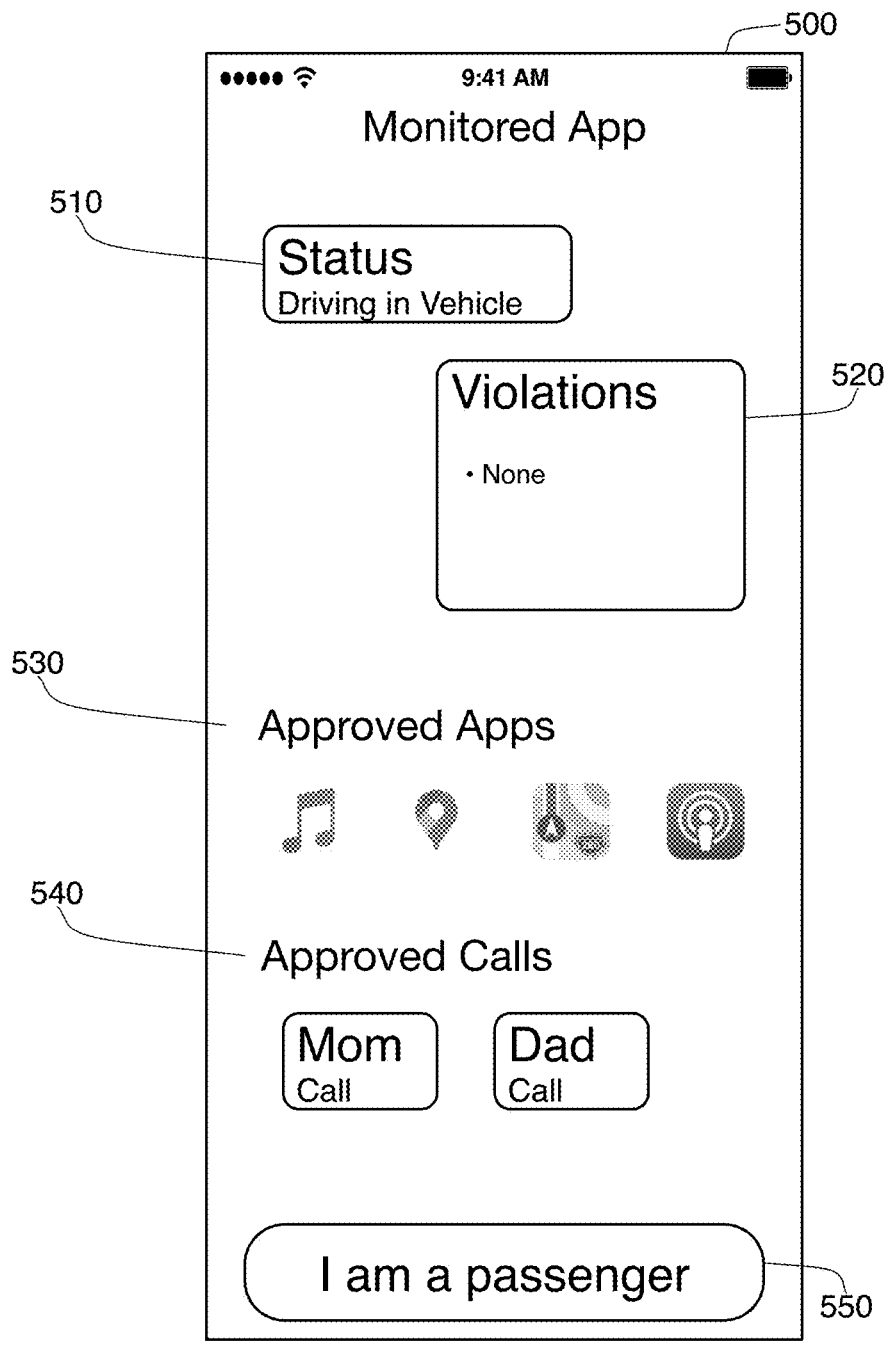
FIG. 5 is a user interface shown on a monitored device during the monitoring of that device.

FIG. 5 shows one embodiment of a user interface 500 that can be presented by the monitored app 122 when it is the foreground app on the device 120. This interface shows a current status (or "mode") 510 for the device 120, which in FIG. 5 shows that the device 120 is moving in a motor vehicle. The shown status 510 should be relevant to the rules 180 that are established for this device 120. Thus, if the rules 180 were based on working hours, or bedtime hours, the status 510 might relate to whether or not these time-based rules are currently in effect. The "driving in vehicle" status of FIG. 5 indicates that the app 122 has determined that the monitored device 120 is currently in a moving vehicle and that driving rules 180 established at step 420 are currently being applied on this device 120. Area 520 of the interface 500 provides a list of currently detected (and, perhaps, previously detected) violation of rules 180. At this time, violations area 520 shows that no rule violations have been detected.

Interface 500 also lists the approved apps 530 that the rules 180 allow for the status given at location 510. In this case, the monitored user is allowed by the rules 180 to operate a music app, two different mapping apps, and a podcast app. These apps were listed as approved, or "whitelisted," by the rules 180 even when the monitored device 120 is operating in driving mode. The interface 500 shows the icons for the approved apps 530 allowing the user to launch the apps without first leaving the monitored app 122. In some cases, the apps may only be authorized in "hands-free" mode. Activating apps that are not on this whitelist of apps 530 would constitute an app usage rule violation.

Interface 500 also provide the ability to make calls or other communications that are approved by the rules 180. For example, the rules 180 created by the monitoring app 112 may allow the monitored device 120 to make calls to two individuals even when the device 120 is in the driving in vehicle status. Thus, two options are presented at interface location 540. Communicating with contacts that are not on this whitelist of contacts 540 would constitute a contact rule violation.

Finally, the rules 180 can allow the monitored user to indicate that, even though they are in a moving vehicle, they are not currently driving. Rather, they are a passenger in the vehicle. This is indicated by the monitored user by selecting interface element 550. The rules 180 can provide for different restrictions when the monitored user is not actually driving the vehicle. As described below, the system 10 may allow the monitoring app 112 to provide control and/or approval over when the monitored device 120 can be placed into passenger mode.

Foreground and Background Mode

The monitored app 122 operates in both foreground mode and background mode on the monitored device 120. Foreground mode indicates that the app 122 is running on the device 120 as the primary or foreground app. The interface 500 shown in FIG. 5 is presented on the user interface 106 of the monitored device 120 only when the monitored app 122 is operating in foreground mode. When running as a foreground app, the monitored app 122 is granted significant leeway by the operating system 108 (on both iOS and Android) with respect to what sensors 108 can be monitored, which services may be monitored and blocked, as well as with respect to notifying both the monitored device 120 and the monitoring device 110 of rule violations. In some embodiments, the monitored app 122 can be operating in foreground mode even when the device 120 is being controlled through Android Auto or Apple CarPlay.

The monitored app 122 can be auto-started into foreground mode upon the occurrence of appropriate triggers. For example, a configured auto Bluetooth hands-free kit might always trigger a launch of the monitored app 122 into the foreground. Once launched, the app 122 can present interface 500 to the monitored user. As a foreground app, the monitored app 122 can grant access to other apps 124. In some circumstances, it is possible to monitor the operation of other apps 124 on the device 120. Of course, any user is able to leave a foreground app such as the monitored app 122 by just providing a command to the operating system 104. However, a rule may establish that the monitored app 122 must be the foreground app whenever the vehicle is in a moving vehicle (or, for example, whenever time restrictions are provided in the rules). If the monitored user takes the monitored app 122 out of the foreground when it is required to be the foreground app, this would constitute a rule violation.

If the monitored app 122 fails to launch (for whatever reason—Bluetooth connection fails, a different vehicle is being used) or if the monitored user manually sends the monitored app 122 into the background, the monitored app 122 will then operate in background mode. In background mode, the monitored app 122 has more limited access to the sensors 108 and data provide by the operating system 104, and less ability to control access to services. Nonetheless, the monitored app 122 is still able to analyze certain information and data and compare it against the rules 180 established for the monitored device 120. In particular, the monitored app 122 may identify that the device 120 is in a moving car and yet neither monitored app 122 nor one of the approved apps 530 is not the foreground app. Even in background mode, the monitored app 122 can know that it is not the foreground app, can detect rule violations 190, can present relevant notifications to the monitored user, and can send remote notifications to server 140 and the monitoring device 110 through system 10.

Rule Violations

As explained above, operating systems 104 such as iOS and Android have the ability to detect driving. Settings in those operating systems allow users to turn off certain functions of the phone during a driving event. Unlike those operating system solutions, however, system 10 does not try to access or limit access to various functions on the device 120. While the approaches of the operating system 104 and that of system 10 are both capable, for instance, of reducing distracted driving, system 10 operates on a model of "Trust But Verify." Instead of trying to block access to functionality on the monitored device 120, system 10 empowers the monitoring device 110 and its user to monitor the usage of the monitored device 120 in a variety of ways, including during driving or during time periods where use of the device 120 is intended to be limited. Violations are reported to the monitoring user 112, and consequences for rule violations can result outside of the realm of system 10.

When the monitored device 120 violates one of the restrictive rules 180 assigned to the relationship 165 in the data 150, the monitored app 122 identifies the violation and records the data locally. These violations may be displayed on the user interface 500, such as location 520. A violation may also be stored at the server 140 as data element 190 in data 150. An important feature of the system 10 is the ability to report violation data 190 to the monitoring app 112. Preferably, rule violations 190 are presented on the monitoring device 110 as push notifications through the user interface 106 operating on the device 110. In one embodiment, the monitoring app 112 can store preferences indicating when these push notifications should be presented. The options include:

Real-Time—which means the monitoring device 110 will present a push notification immediately on detection of a violation 190 of a rule 180 as observed by the monitored app 122;

End of Trip—since the monitored app 122 detects both the start and finish of a drive/trip event (when the device 120 has indicated that it is in a moving motor vehicle), it is possible to store any and all violations 190 identified during that trip and then report all violates to the monitoring device 110 after the end of the trip;

Once a Day—rule violations 190 observed by the monitored app 122 are accumulated and presented at selected time each day;

None—which means no push notifications will be delivered to the monitoring device 110; rather, the monitoring user must manually observe reported rule violations by opening the monitoring app 112 and looking at logged rule violation data 190 using a log interface provided by the monitoring app 112.

Geofencing and Proximity Forgiveness of Rules

In certain contexts, system 10 will forgive behaviors that might otherwise be violations of rules 180. For example, employers may want to monitor their employees' use of devices 120 only when the employees are not at their primary work location. Alternatively, parents may want to monitor their children's use of devices 120 only when the child is not with their parents. If a child is with their parents, the parents can engage in direct supervision of the use of the monitored device 120 and the automated monitoring of system 10 is not needed. This ability to create geofencing parameters for rules, or to forgive violations of rules in the case of proximity to the monitoring device 110, can be assigned to all rules 180 or only to a subset of the rules 180.

To allow for proximity forgiveness, the monitoring app 112 will need to seek permission to monitor the location of the monitoring device 110. This location will be provided to the server 140, which can then determine that certain violations detected by the monitored app 122 should be forgiven because of the proximity of the monitoring device 110. This determination can occur at the server 140, or the location of the monitoring device 110 can be provided to the monitored device 120 to let this determination be made at the monitored device 120. Other geofencing restrictions, such as outside-of-workplace travel restrictions, would be governed by the geographical boundaries established by the monitoring app 112 when defining the rules 180.

In some embodiments, sufficient location information may not be available to detect the location of one or both of the monitoring device 110 and the monitored device 120. In these cases, rather than comparing location data (such as from GPS location sensors), other nearby-detection technologies may be used. For instance, many devices 100 can detect and identify nearby devices through wireless signals, such as Bluetooth or Wi-Fi. Airdrop, a service offered on iOS devices, works similarly, and the same technology can be used to detect the physical closeness of smart phones.

Passenger Mode Requests that are Approved by Parent

As explained above, interface 500 is presented by the monitored app 122 when the device 120 is in moving motor vehicle. The driving status 510 may impose restrictive rules 180 on use of the monitored device 120 because of the inherent dangers of using such a device 120 while driving. When the user is merely a passenger in a vehicle, however, the dangers are much less. Thus, many prior art systems, including those provided by current operating systems 104 of smartphones, allow users to specify that they are merely a passenger in the vehicle. However, since there is no ability to verify this, user interfaces that allow the user to select themselves out of a restrictive mode by indicating they are a passenger are not always helpful. There is an incentive for users to so indicate their passenger status even when driving simply to avoid the restrictions.

Figure 6:
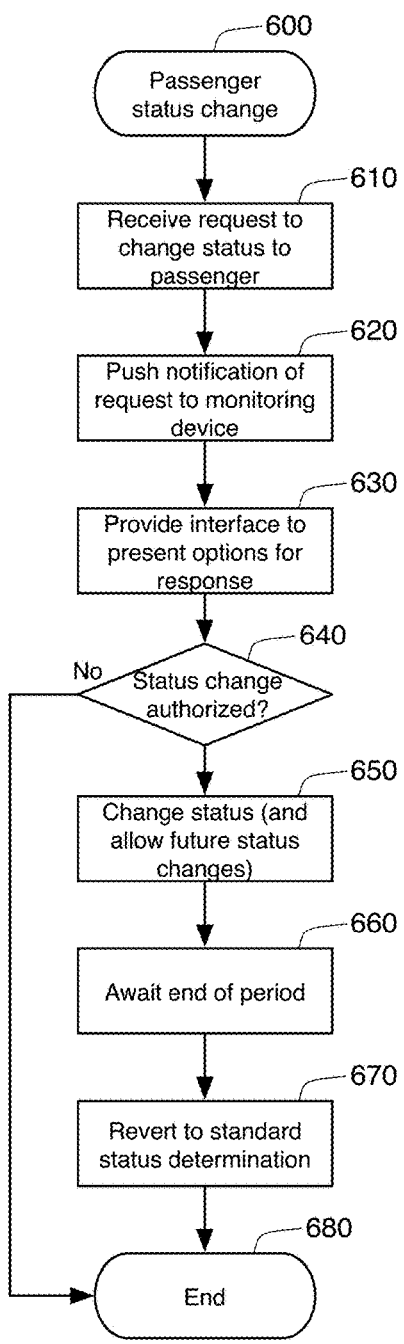
FIG. 6 is a flowchart showing a method for requesting a change of status from driving to passenger.
Figure 7:
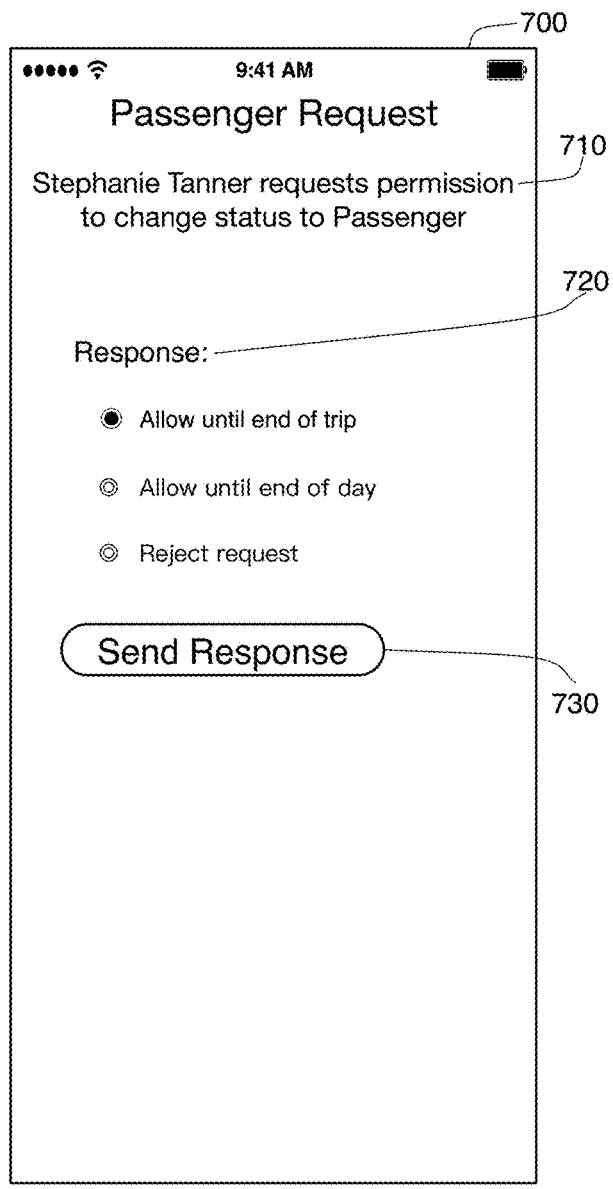
FIG. 7 is a user interface shown on the monitoring device as part of the method of FIG. 6.

System 10 also allows a monitored user to indicate that they are a passenger by selecting user interface element 550. However, rather than automatically changing the status of the monitored app 122, the receipt of this indication is merely the first step 610 in the process 600 of changing this status, as shown in FIG. 6. The second step 620 is to send a push notification to the monitoring device(s) 110 that are monitoring this monitored device 120. The push notification will be received by the monitoring app 112, which will cause the operating system 104 to present a notice to a monitoring user on user interface 106. This notice will indicate that a passenger status request has been made by the monitored device 120. If the monitoring user selects the notice, the monitoring app 112 will present to the user an interface such as interface 700 shown in FIG. 7 at step 630.

Interface 700 identifies the monitored user that is making the passenger request at 710. The interface 700 also presents three options 720 for responding to this request: i) allow until end of trip; ii) allow until end of day; and iii) reject request. The allow until end of trip option means that the monitoring user approves passenger status, and the monitored app 122 will enter that status. The monitored app 122 will stay in passenger status until the end of that trip. If the monitored user then begins another trip and wishes to enter passenger mode again, they will need to receive permission again using method 600.

If the "allow until end of day" option is selected, the monitored app 122 will also enter passenger status. In addition, passenger status requests for separate trips that are made later in that same day will not have to be approved by the monitoring app 112. On the next calendar day, new passenger requests will need to seek approval through method 600.

If the "reject request" option is selected, passenger status is disallowed. That means that the monitored app 122 will not be allowed to enter passenger status. It will remain in driver status and will continue to log all rule violations with the assumption that the monitored user is driving the moving vehicle.

The monitoring user selects one of these options at interface element 720, and then submits the response by selecting button 730. This is all part of step 630. Step 640 determines which response 720 was selected. If a change to passenger status is not authorized, then the process simply ends at step 680 without any change in the status of the monitored app 122. If one of the other two responses 720 were selected, then step 650 will change the status of the monitored app 122 to passenger status. Step 660 will then await the end of the time period selected in the response 720. After which, step 670 will revert the monitored app 122 to its standard process for determining the status 510 of the monitored device 120.

Note that if "allow until end of trip" were selected, the monitored app 122 will stay in passenger status until the end of the trip. Once the trip was over, the app 122 will again look for the monitored device 120 to enter driving mode and, when this is detected, driving status will be reengaged. If the user again wants to enter passenger status, method 600 will again require permission from the monitoring app 112. If "allow until end of day" were selected, the behavior would be similar except that if the user wants to reenter passenger status later in the same day, the user would simply press button 550 and no permission under method 600 would be needed.

The requirement for passenger status approval under method 600 can be set as an option or rule 180 for the monitoring of the monitored device 120. This means that the monitoring user may elect not to require approval method 600 for some or all of their monitored devices 120.

Approval of Apps and Contacts

The monitoring app 112 is also in control of which apps 530 are approved and shown in interface 500, and which contacts 540 are approved and shown in interface 500. These can be selected by the monitoring app 112 as part of the rule creation process 400 for a relationship 650. Alternatively, a "request new" button may be placed proximate to area 530 to allow the monitored device 120 to request new apps, or proximate to area 540 to allow the monitored device 120 to request new contacts. Using a method similar to method 600 for approving passenger status, the request for a new app 530 or contact 540 can be submitted to the monitoring app(s) 112 for approval.

Figure 8:
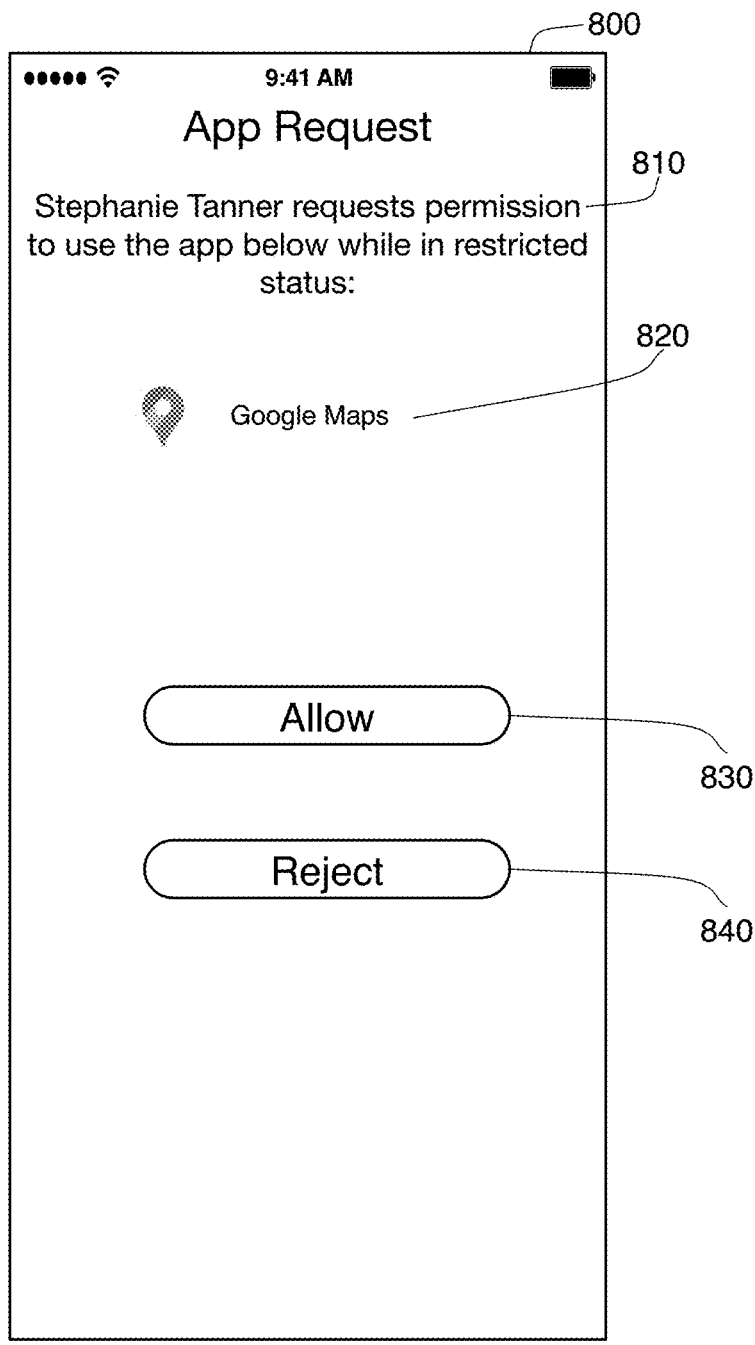
FIG. 8 is a user interface shown on the monitoring device for a request to add an app to a white list for a monitored device.

In most cases, requests could not be submitted during "driving" status, nor perhaps during temporal restrictions. But if the phone is not in a restrictive mode, the monitored app 122 could present a request button (not shown in the figures). The monitored app 122 would let the user select a selected app or contact. A push notification would be presented to the monitoring app(s) 112, and an interface such as interface 800 shown in FIG. 8 would be presented to the monitoring user. The interface 800 describes the request 810, visually identifies the requested app or contact 820, and then allows the monitoring user to approve 830 or deny 840 the request. If approved, the new app or contact would be added to the interface 500 during restricted use.

Distress Stream Video Connection

Figure 9:
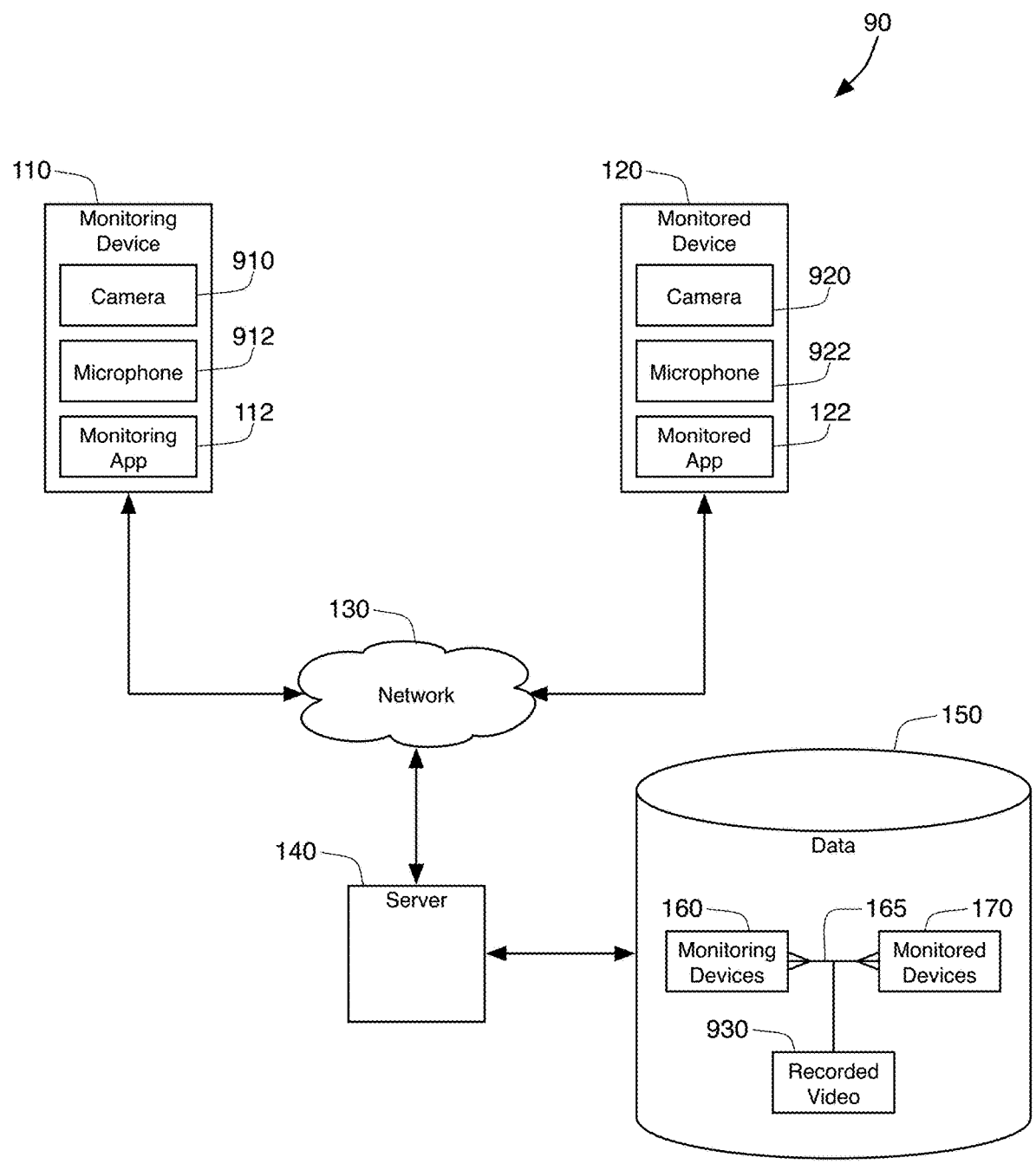
FIG. 9 is a schematic view of a system comprising the same devices as FIG. 1 configured to record a distress stream.

FIG. 9 shows a system 90 similar to system 10, but system 90 includes the ability to generate a distress video recording and connection. In this system 90, both the monitoring device 110 and the monitored device 120 include a camera 910, 920, respectively, for recording images and video and a microphone 912, 922 for receiving sound input. These cameras 910, 920 and microphones 912, 922 could be considered sensors 108 as shown in connection with system 10 in FIG. 1. The camera 920 and microphone 922 on the monitored device 120 are used to created recorded video 930 that is saved in the data 150 managed by the server 140. This video 930 may also include visual and audio data received by at the monitoring device 110 as well.

Figure 10:
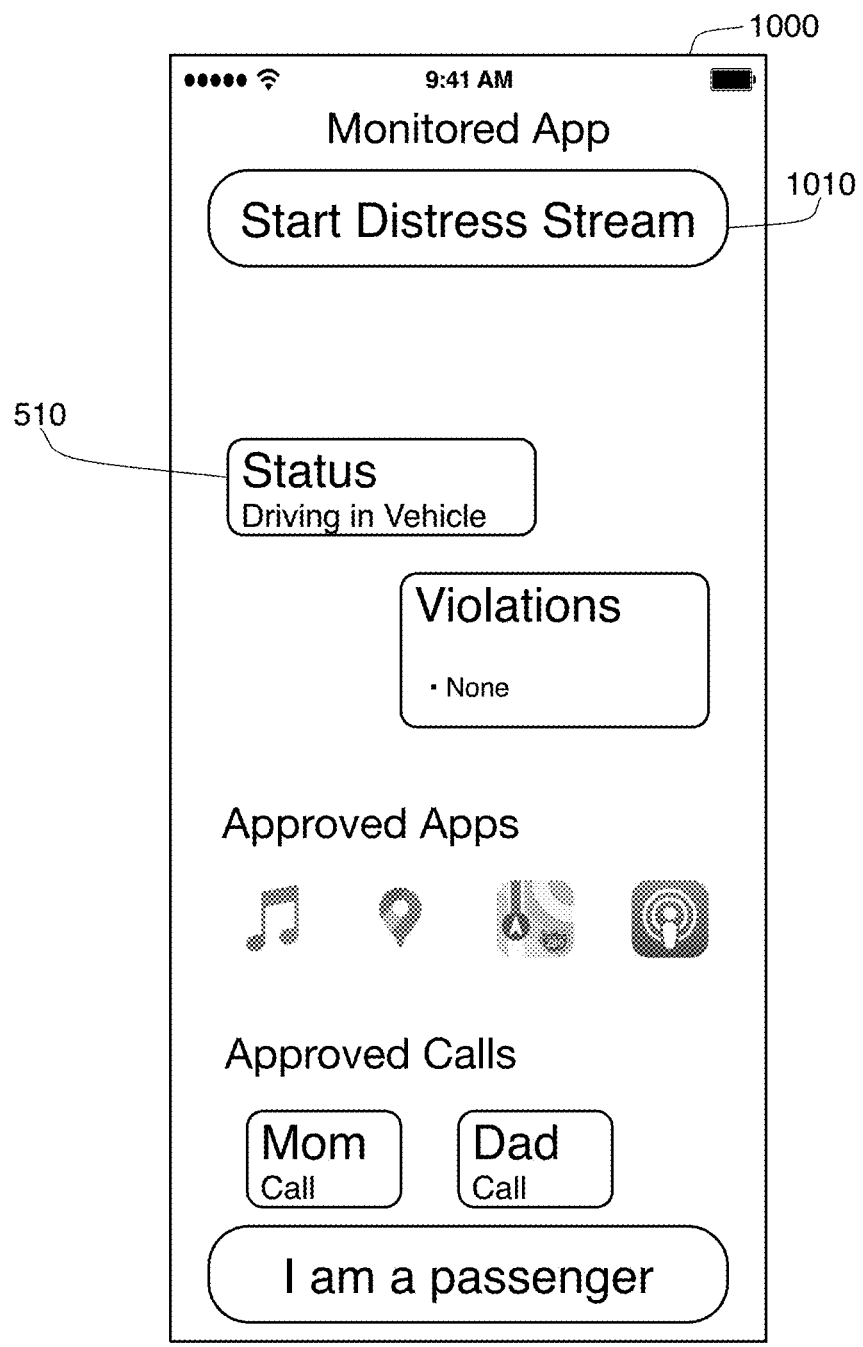
FIG. 10 is a user interface shown on the monitored device including a UI element to start the distress stream.

This recorded video 930 can be generated quickly and easily during a distressing situation by the monitored device 120 and is therefore referred to herein as a distress video or distress stream. FIG. 10 shows an interface 1000 created by the monitored app 122 that is similar to the interface 500 described above in connection with FIG. 5. The interface 1000 adds a user interface element 1010 to start a distress stream. This interface element 1010 can be present on the user interface of the monitored app 122 regardless of the status 510 of the app 122. In FIG. 10, the app 122 is in a driving status 510, but the app 122 could be in a passenger status, or a time-period-constrained status, or an unconstrained use status. This interface element 1010 is, however, perhaps most useful in a constrained status such as driving. In the driving status 510, use of the monitored device 120 is restricted and, typically, the monitored app 122 is required to be in the foreground displaying user interface 1000. Thus, this interface 1000 will be constantly presented to the monitored user when driving, including the single button 1010 that starts the distress stream.

Figure 11:
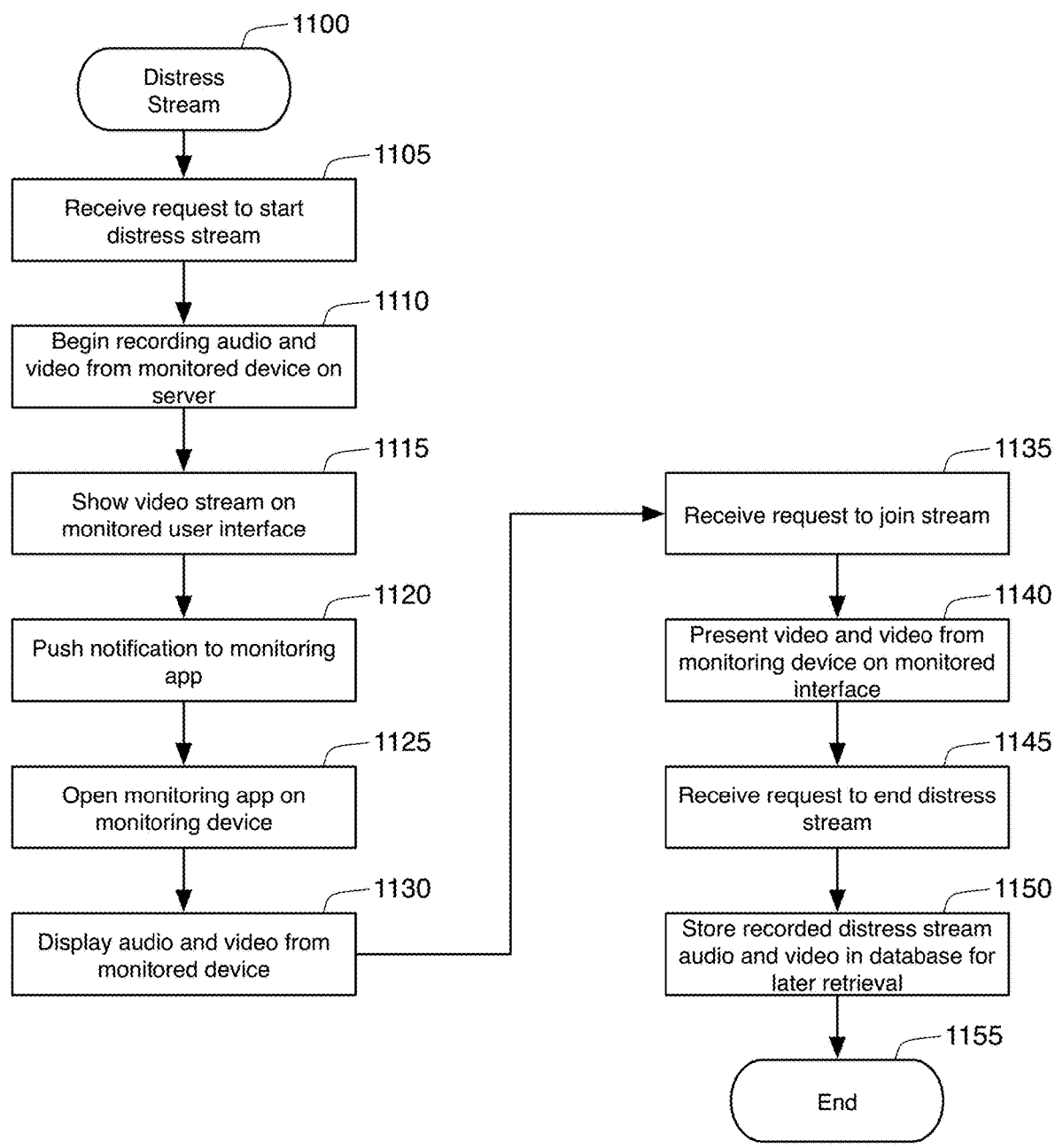
FIG. 11 is a flowchart showing a method for providing the distress stream.

The distress stream process 1100 is shown in the flowchart provided on FIG. 11. The distress stream process 1100 is useful when the user of the monitored device 120 wishes to share a live audio visual stream with one or more monitoring users. In the context of a parent or child, the child might select the start distress stream button 1010 if they were driving and are being pulled over by the police, or if they have ended up in a ditch. An employee may wish to start the distress stream process 1100 if they are encountering a rude or complaining customer, or they are involved in an otherwise difficult or dangerous encounter.

The first step 1105 of the distress stream process 1100 is the receipt of a request to start the distress stream. This request can take the form of the monitored user selecting the start distress stream button 1010 in interface 1000. The next step 1110 is to transmit visual data from the camera 920 and audio data from the microphone 922 to the server 140 for storage as recorded video 930 on database 150. This step 1110 happens immediately upon receiving the request 1105. As long as there is a good connection over the network 130, there is no need to first create a video file the monitored device 120 and then transmit that video file to the server 140 only after completion. While other systems for creating and storing video files may take this approach, the ability to immediately record the audio and visual from the monitored device 120 on the remote server 140 and database 150 ensures that the distress stream is recorded in near real-time outside the monitored device 120. This increases the security of the recorded video 930 and prevents a malevolent destruction of the monitored device 120 causing the loss of the recorded video 920.

At step 1115, the user interface of the monitored device shows the visuals being captured and transmitted as part of the recorded video 920 so that the monitored user knows that the distress stream has started. At step 1120, a push notification is transmitted over the network 130 to the monitoring app 112, which then presents the notification via the operating system 104 of the device 110. If the monitoring user selects this push notification, the monitoring app 112 will open on the monitoring device 110 at step 1125.

Figure 12:
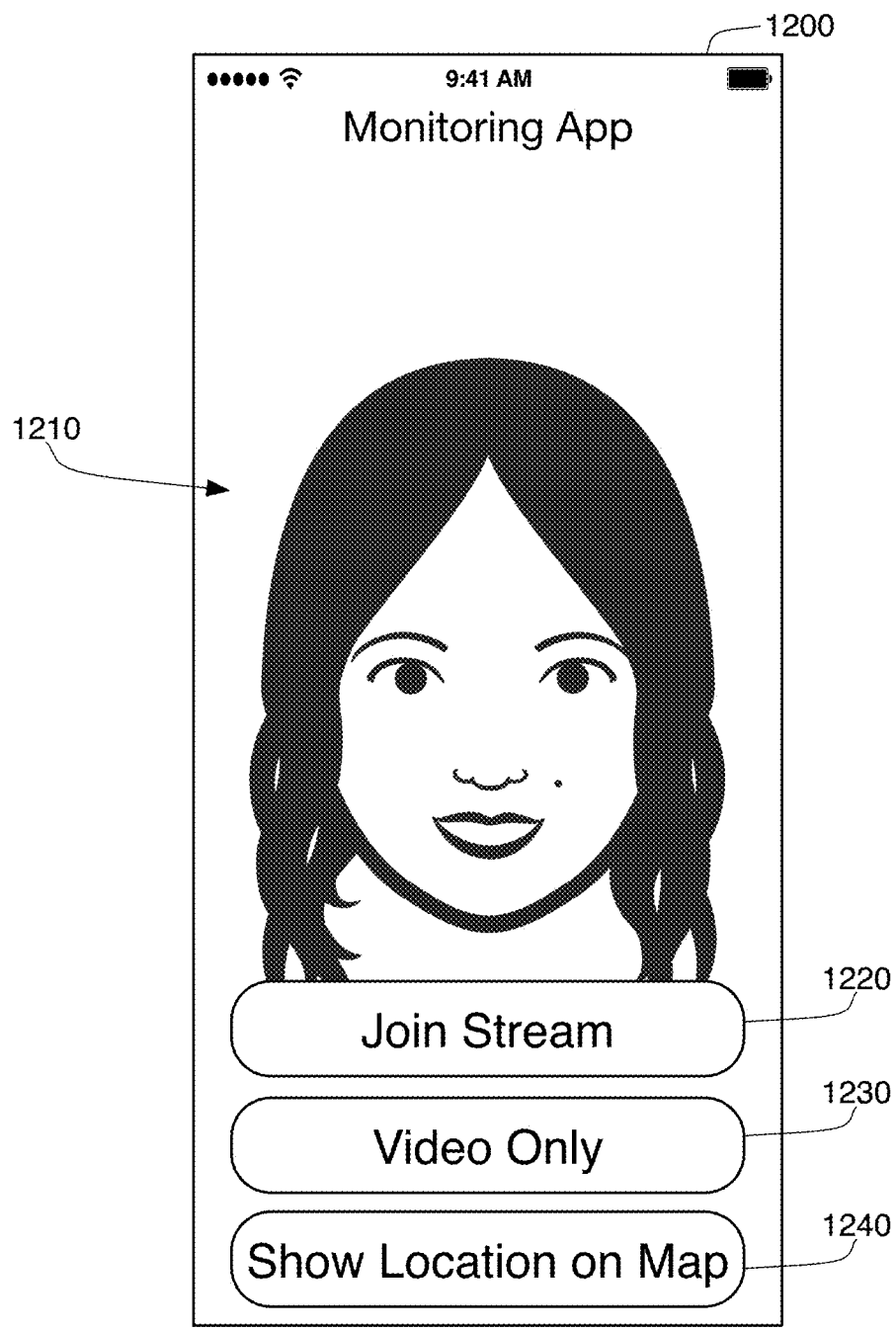
FIG. 12 is a user interface shown on the monitoring device during the distress stream.

At this point, the audio and visual data that form the recorded distress stream 930 are presented live on the user interface of the monitoring device 110 at step 1130. This can be seen in user interface 1200 shown in FIG. 12. The face of the monitored user 1210 (or any other images that are currently being recorded by the camera 900 on the monitored device) is presented foremost in this interface 1200, but this interface 1200 does also includes three buttons 1220, 1230, 1240. The first 1220 allows the monitoring user to join the stream by streaming audio and visuals from their microphone 912 and camera 910 to both the monitored device 120 (to be presented on that device 120) and to the server 140 (to be included as part of the recorded distress stream video data 930).

If this button 1220 is pressed, a request to join the distress stream is presented to the server 140 at step 1135. At step 1140, the audio recorded by the monitoring device microphone 912 and the visuals from the monitoring device camera 910 are presented on a user interface 1300 displayed by the monitored app 122, as shown on FIG. 13. This monitored app interface 1300 is again dominated by the visual 1310 being recorded by the monitored device camera 920. In addition, an inset window 1320 displays the visuals from the monitoring device camera 910. Meanwhile, the audio from the monitoring device microphone 912 is also presented on the monitored device 110. Thus, the child can see and hear a live streaming video of their parent during a stressful encounter and engage in a conversation, or an employee can be assured that their supervisor is witnessing an important interaction or a dangerous situation. The monitored app interface 1300 also presents an interface element 1330 that allows audio from the monitoring device 110 to be muted. The end button 1340 is always present on the monitored app interface 1300 during distress streaming. If pressed, the monitored user is asked to verify the end of the stream. If they confirm their intention to end the stream, this is received by method 1100 at step 1145. At this point, the method 1100 will complete the recording of the stream 930 at step 1150 and store it in the database 150 for later retrieval by the related monitoring devices 110. The method 1100 then ends at 1155.

Returning to the other buttons 1230, 1240 presented on interface 1200, the second button 1230 is a video only button. If selected, this button 1230 indicates that the monitoring user only wishes to watch and listen to the distress video stream. This means that the monitoring device 110 will present what is happening at the monitored device 120 but the monitoring device 110 will not send audio or visual data back to the monitored device 120. The monitored app interface 1300 would remain similar to that shown in FIG. 13, although the inset window 1320 would not be present. The third button 1240 utilizes the fact that the monitored app 122 monitors position sensors 108 on the monitored device 120 and shares this data to the server 140. This means that the server 140 can record this location information along with the recorded distress stream video 930. This location information is also shared with the monitoring app 112, allowing interface 1200 to pull up a map on a mapping app showing the exact location of the monitored device 120 during the distress stream.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A method of monitoring a monitored device comprising:
    a) linking a monitoring device to the monitored device by:
        i) created a deep link in a monitoring app operating on the monitoring device, the deep link including information sufficient to link the monitored device back to the monitoring device,
        ii) transmitting the deep link in a message from the monitoring device to the monitored device,
        iii) executing the deep link to download a monitored app,
        iv) opening the deep link on the monitored app and transmitting the information to a server, and
        v) establishing relationship data at the server linking the monitoring device to the monitored device using the information;
    b) establishing rules at the monitored device by:
        i) creating rules on the monitoring app that define usage restrictions on the monitored device for a driving status, and
        ii) transferring the rules to the monitored app;
    c) determining the monitored device to be in the driving status by detecting movement of the monitored device;
    d) reporting rule violations by:
        i) determining that usage of the monitored device violated at least one of the rules during the driving status,
        ii) transmitting data describing the rule violation to the monitoring app on the monitoring device, and
        iii) presenting the data describing the rule violation through a user interface on the monitoring device;
    e) altering the status of the monitored device to a passenger status by:
        i) receiving a request to enter passenger status after determining the monitored device to be in the driving status;
        ii) transmitting the request to enter passenger status to the monitoring device;
        iii) receiving a confirmation on the monitoring device authorizing a change to the passenger status;
        iv) transmitting the confirmation to the monitored device, and,
        v) after receiving the transmission of the confirmation, changing the status of the monitored device to the passenger status;
    f) transmitting a distress stream from the monitored device by:
        i) presenting, by the monitored app, an interface screen during the driving mode including a single action interface element for starting the distress stream,
        ii) receiving, at the monitored app, a selection of the single action interface element,
        iii) receiving, at the monitored app, audio data from a microphone on the monitored device and visual data from a camera on the monitored device,
        iv) transmitting, from the monitored app, a video stream of the audio data and the visual data,
        v) receiving the video stream at the server,
        vi) recording, at the server, the video stream for later replay,
        vii) receiving the video stream at the monitoring app,
        viii) presenting, by the monitoring app, the video stream on the user interface of the monitoring device.

2. The method of claim 1, wherein the linking of the monitoring device to the monitored device further comprises:
    vi) presenting codes through the monitoring app and the monitored app;
    vii) presenting a first call link directly to the monitoring device through the monitored app,
    viii) presenting a second call link directly to the monitored device through the monitoring app, and
    ix) receiving confirmation from both the monitoring app and the monitored app that a verbal exchange of codes was successful.

3. The method of claim 1, wherein usage that would violate at least one of the rules during driving status wound not violate the at least one of the rules during passenger status.

4. The method of claim 1, wherein a plurality of the rules define usage restrictions on the monitored device during a time period.

5. The method of claim 1, wherein a plurality of the rules define usage restrictions on the monitored device when the monitored device is in a defined geographic location.

6. The method of claim 1, wherein usage that would comprise a violation a first rule is forgiven based on the proximity of the monitored device to the monitoring device.

7. The method of claim 6, wherein the proximity is determined by a comparison of data provided by location sensors on the monitored device and the monitoring device.

8. The method of claim 6, wherein the proximity is determined by a detecting wireless signals emanated by the monitoring device on the monitored device.

9. The method of claim 1, wherein the confirmation of the change to passenger status lasts only for a current trip.

10. The method of claim 1, wherein the confirmation of the change to passenger status lasts for a calendar data, and during the calendar day subsequent requests to enter passenger status result in a change of the status of the monitored device without requiring confirmation from the monitoring device.

11. The method of claim 1, wherein the monitored app during driving status presents a restricted user interface that presents whitelisted apps that can be activated without violating the rules, wherein activation of apps other than the whitelisted apps comprises an unauthorized app rule violation; and whitelisted contacts that can be contacted without violating the rules, wherein contacting contacts other than the whitelisted contacts comprises an unauthorized contact rule violation.

12. The method of claim 11, further comprising altering the whitelisted apps by:
 i) receiving an app request to alter the whitelisted apps by adding a requested app;
 ii) transmitting the app request identifying the requested app to the monitoring device;
 iii) receiving an app change confirmation on the monitoring device authorizing the app request;
 iv) transmitting the app change confirmation to the monitored device, and,
 v) after receiving the transmission of the app change confirmation, changing whitelisted apps to include the requested app.

13. The method of claim 11, further comprising altering the whitelisted contacts by:
 i) receiving a contact request to alter the whitelisted contacts by adding a requested contact;
 ii) transmitting the contact request identifying the requested contact to the monitoring device;
 iii) receiving a contact change confirmation on the monitoring device authorizing the contact request;
 iv) transmitting the contact change confirmation to the monitored device, and,
 v) after receiving the transmission of the contact change confirmation, changing whitelisted contacts to include the requested contact.

14. The method of claim 1, wherein the step of transmitting the distress stream further comprises:
 ix) transmitting, from the monitoring app, a monitoring video stream generated from audio and visual data received at the monitoring device,
 xi) receiving and recording the monitoring video stream at the server, and
 i) receiving and presenting the monitoring video stream at the monitored device.

15. The method of claim 14, further comprising the monitored app providing a mute interface element to mute audio from the monitoring video stream.

16. A method of monitoring a monitored device comprising:
 a) linking a monitoring device to the monitored device by:
  i) created a deep link in a monitoring app operating on the monitoring device, the deep link including information sufficient to link the monitored device back to the monitoring device,
  ii) transmitting the deep link in a message from the monitoring device to the monitored device,
  iii) executing the deep link to download a monitored app,
  iv) opening the deep link on the monitored app and transmitting the information to a server, and
  v) establishing relationship data at the server linking the monitoring device to the monitored device using the information;
 b) establishing rules at the monitored device by:
  i) creating rules on the monitoring app that define usage restrictions on the monitored device for a restricted status, and
  ii) transferring the rules to the monitored app;
 c) determining the monitored device to be in the restricted status by analyzing sensors on the monitored device; and
 d) reporting rule violations by:
  i) determining that usage of the monitored device violated at least one of the rules during the restricted status,
  ii) transmitting data describing the rule violation to the monitoring app on the monitoring device, and
  iii) presenting the data describing the rule violation through a user interface on the monitoring device.

17. The method of claim 16, wherein the linking of the monitoring device to the monitored device further comprises:
 vi) presenting codes through the monitoring app and the monitored app;
 vii) presenting a first call link directly to the monitoring device through the monitored app,
 viii) presenting a second call link directly to the monitored device through the monitoring app, and
 ix) receiving confirmation from both the monitoring app and the monitored app that a verbal exchange of codes was successful.

18. A method of monitoring a monitored device comprising:
 a) linking a monitoring device to the monitored device by operating a monitoring app on the monitoring device and a monitored app on the monitored device, and establishing a relationship between the devices at a server database:
 b) establishing rules at the monitored device by:
  i) creating rules on the monitoring app that define usage restrictions on the monitored device for a driving status, and
  ii) transferring the rules to the monitored app;
 c) determining the monitored device to be in the driving status by detecting movement of the monitored device;
 d) reporting rule violations by:
  i) determining that usage of the monitored device violated at least one of the rules during the driving status,
  ii) transmitting data describing the rule violation to the monitoring app on the monitoring device, and
  iii) presenting the data describing the rule violation through a user interface on the monitoring device;
 e) altering the status of the monitored device to a passenger status by:
  i) receiving a request to enter passenger status after determining the monitored device to be in the driving status;
  ii) transmitting the request to enter passenger status to the monitoring device;
  iii) receiving a confirmation on the monitoring device authorizing a change to the passenger status;

iv) transmitting the confirmation to the monitored device, and,
v) after receiving the transmission of the confirmation, changing the status of the monitored device to the passenger status.

19. The method of claim 18, wherein usage that would violate at least one of the rules during driving status wound not violate the at least one of the rules during passenger status.

20. A method of monitoring a monitored device comprising:
a) linking a monitoring device to the monitored device by operating a monitoring app on the monitoring device and a monitored app on the monitored device, and establishing a relationship between the devices at a server database:
b) establishing rules at the monitored device by:
  i) creating rules on the monitoring app that define usage restrictions on the monitored device for a restricted status, and
  ii) transferring the rules to the monitored app;
c) determining the monitored device to be in the restricted status by analyzing sensors on the monitored device;
d) reporting rule violations by:
  i) determining that usage of the monitored device violated at least one of the rules during the restricted status,
  ii) transmitting data describing the rule violation to the monitoring app on the monitoring device, and
  iii) presenting the data describing the rule violation through a user interface on the monitoring device;
e) transmitting a distress stream from the monitored device by:
  i) presenting, by the monitored app, an interface screen during the restricted status including a single action interface element for starting the distress stream,
  ii) receiving, at the monitored app, a selection of the single action interface element,
  iii) receiving, at the monitored app, audio data from a microphone on the monitored device and visual data from a camera on the monitored device,
  iv) transmitting, from the monitored app, a video stream of the audio data and the visual data,
  v) receiving the video stream at the server,
  vi) recording, at the server, the video stream for later replay,
  vii) receiving the video stream at the monitoring app,
  viii) presenting, by the monitoring app, the video stream on the user interface of the monitoring device.

* * * * *